United States Patent
Shim et al.

(10) Patent No.: US 10,840,523 B2
(45) Date of Patent: Nov. 17, 2020

(54) APPARATUS AND METHOD FOR DISCHARGING CONDENSATE OF A FUEL CELL STACK

(71) Applicants: HYUNDAI MOTOR COMPANY, Seoul (KR); KIA MOTORS CORPORATION, Seoul (KR)

(72) Inventors: Hyo Sub Shim, Suwon-si (KR); Hyun Joon Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 194 days.

(21) Appl. No.: 16/118,496

(22) Filed: Aug. 31, 2018

(65) Prior Publication Data
US 2018/0375124 A1 Dec. 27, 2018

Related U.S. Application Data
(62) Division of application No. 14/951,435, filed on Nov. 24, 2015, now abandoned.

(30) Foreign Application Priority Data
Sep. 17, 2015 (KR) .......... 10-2015-0131656

(51) Int. Cl.
*H01M 8/04* (2016.01)
*H01M 8/04119* (2016.01)
(Continued)

(52) U.S. Cl.
CPC .......... *H01M 8/04164* (2013.01); *G05D 9/12* (2013.01); *H01M 8/04589* (2013.01)

(58) Field of Classification Search
CPC ............ H01M 8/04; H01M 8/10; H01M 8/12; H01M 8/04119; G05D 9/12
See application file for complete search history.

(56) References Cited

U.S. PATENT DOCUMENTS 3,112,229 A * 11/1963 Bacon ..................... H01M 8/04
429/414
3,629,075 A 12/1971 Gutbier
(Continued)

FOREIGN PATENT DOCUMENTS

JP 2012-099445 A 5/2012
JP 2012-0994454 A 5/2012
(Continued)

OTHER PUBLICATIONS

Non-Final Office Action issued in U.S. Appl. No. 14/951,435, dated Feb. 13, 2018.
(Continued)

*Primary Examiner* — Kenneth J Douyette
(74) *Attorney, Agent, or Firm* — Morgan, Lewis & Bockius LLP

(57) ABSTRACT

An apparatus for discharging a condensate of a fuel cell stack, the apparatus includes a condensate storage container for storing the condensate from the fuel cell stack, a condensate level detector for detecting a condensate level in the condensate storage container, a discharge valve configured to be opened and closed to discharge the condensate from the condensate storage container, and a control unit for setting a condensate discharge level differently according to currents of the fuel cell stack, and for controlling the discharge valve to be opened when a condensate level measured by the condensate level detector reaches the condensate discharge level.

6 Claims, 2 Drawing Sheets

(51) Int. Cl.
     *G05D 9/12*           (2006.01)
     *H01M 8/04537*    (2016.01)

(56) References Cited

U.S. PATENT DOCUMENTS

| 8,518,588 | B2 | 8/2013 | Wake et al. |
| 2012/0115055 | A1 | 5/2012 | Wake et al. |
| 2012/0315559 | A1 | 12/2012 | Noh et al. |

FOREIGN PATENT DOCUMENTS

| KR | 10-0767520 B1 | 10/2007 |
| KR | 10-2010-0052058 A | 5/2010 |
| KR | 10-2015-0049155 A | 5/2015 |
| KR | 10-2015-0072238 A | 6/2015 |

OTHER PUBLICATIONS

Final Office Action issued in U.S. Appl. No. 14/951,435, dated Jun. 8, 2018.

\* cited by examiner

APPARATUS AND METHOD FOR DISCHARGING CONDENSATE OF A FUEL CELL STACK

CROSS-REFERENCE TO RELATED APPLICATIONS

This application is a divisional of U.S. patent application Ser. No. 14/951,435, filed Nov. 24, 2015, now abandoned, which claims the benefit of priority of Korean Patent Application No. 10-2015-0131656, filed on Sep. 17, 2015 with the Korean Intellectual Property Office, the disclosures of each are incorporated herein in their entirety by reference.

TECHNICAL FIELD

The present disclosure relates to an apparatus and method for discharging condensate of a fuel cell stack, and more particularly, to an apparatus and method for discharging condensate of a fuel cell stack capable of effectively preventing flooding of a fuel cell stack and enhancing durability of a discharge valve by varying a discharge level of a condensate according to a current (high current/low current) of a fuel cell.

BACKGROUND

A fuel cell system is a type of power generation system producing electric energy through an electrochemical reaction between oxygen in the air and hydrogen supplied as fuel.

The fuel cell system includes a stack, as an electricity generation assembly of unit fuel cells including a cathode and an anode, an air supply device supplying air to the cathodes of the unit fuel cells, and a hydrogen supply device supplying hydrogen to the anodes of the unit fuel cells.

Due to operation of the fuel cell system, water is produced in the cathode, and a partial amount of the produced water moves to the anode through an electrolyte membrane due to a difference in concentration. The water circulates with the anode together with a re-circulated gas, and a portion thereof is condensed and stored in a condensate storage container. A condensate level sensor is installed in the condensate storage container, and when a predetermined amount of condensate is stored in the condensate storage container, it is discharged outwardly.

When the fuel cell system is operated, a relatively large amount of hydrogen is supplied to the anodes of the stack in a high current region, and in addition, a re-circulated gas (including a hydrogen gas) is supplied at a high flow rate to the interior of the stack. Here, when condensate rises to an upper end of the condensate storage container, the condensate is introduced to the interior of the stack due to a high flow rate of the re-circulated gas, causing flooding, and due to this, hydrogen is not smoothly supplied to the stack and performance is degraded.

Meanwhile, in a low current region of the fuel cell system, since a relatively small amount of hydrogen is supplied to the anodes of the stack, a flow of hydrogen is slow, and thus, even though the condensate rises to the upper end of the condensate storage container, a possibility that the condensate is introduced to the interior of the stack is low, and thus, flooding does not occur.

Also, in conventional full cell system, since a condensate discharge level as a discharge reference of a condensate is specified regardless of current, a valve switching operation of the condensate storage container is not effectively performed, resulting an adverse durability life of the valve.

SUMMARY OF THE DISCLOSURE

The present disclosure has been made to solve the above-mentioned problems occurring in the prior art while advantages achieved by the prior art are maintained intact.

An aspect of the present disclosure provides an apparatus and method for discharging condensate of a fuel cell stack, capable of effectively preventing flooding of a fuel cell stack and enhancing durability of a discharge valve by varying a discharge level of a condensate according to a current (high current/low current) of a fuel cell.

According to an exemplary embodiment of the present disclosure, an apparatus for discharging condensate of a fuel cell stack includes: a condensate storage container configured to store a condensate from a fuel cell stack; a condensate level detector configured to detect a condensate level in the condensate storage container; a discharge valve configured to be opened and closed to discharge a condensate from the condensate storage container; and a control unit configured to set a condensate discharge level differently according to currents of the fuel cell stack, and control the discharge valve to be opened when a condensate level measured by the condensate level detector reaches the condensate discharge level.

The condensate level detector may be configured as a condensate level sensor extending in a gravitation direction.

When a current from the fuel cell stack is greater than a reference current, the control unit may set a point in time at which the discharge valve is to be opened to a first condensate discharge level.

When the current from the fuel cell stack is lower than the reference current, the control unit may set a point in time at which the discharge valve is to be opened to a second condensate discharge level.

The second condensate discharge level may be set to a position higher than that of the first condensate discharge level.

According to another exemplary embodiment of the present disclosure, a method for discharging condensate of a fuel cell stack includes: measuring, by a condensate level detector, a condensate level of the condensate storage container in real time; and setting a condensate discharge level differently according to a current from the fuel cell stack, and opening the discharge valve when a condensate level measured by the condensate level detector reaches the condensate discharge level.

When a current from the fuel cell stack is greater than a reference current, a first condensate discharge level corresponding to a point in time at which the discharge valve is to be opened may be set, and when a condensate level in the condensate storage container is higher than the first condensate discharge level, the discharge valve may be opened.

When a condensate level in the condensate storage container is lower than a lower limit value, the discharge valve may be closed.

When a current from the fuel cell stack is smaller than the reference current, a second condensate discharge level corresponding to a point in time at which the discharge valve is to be opened may be set, and when a condensate level in the condensate storage container is higher than the second condensate discharge level, the discharge valve may be opened.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
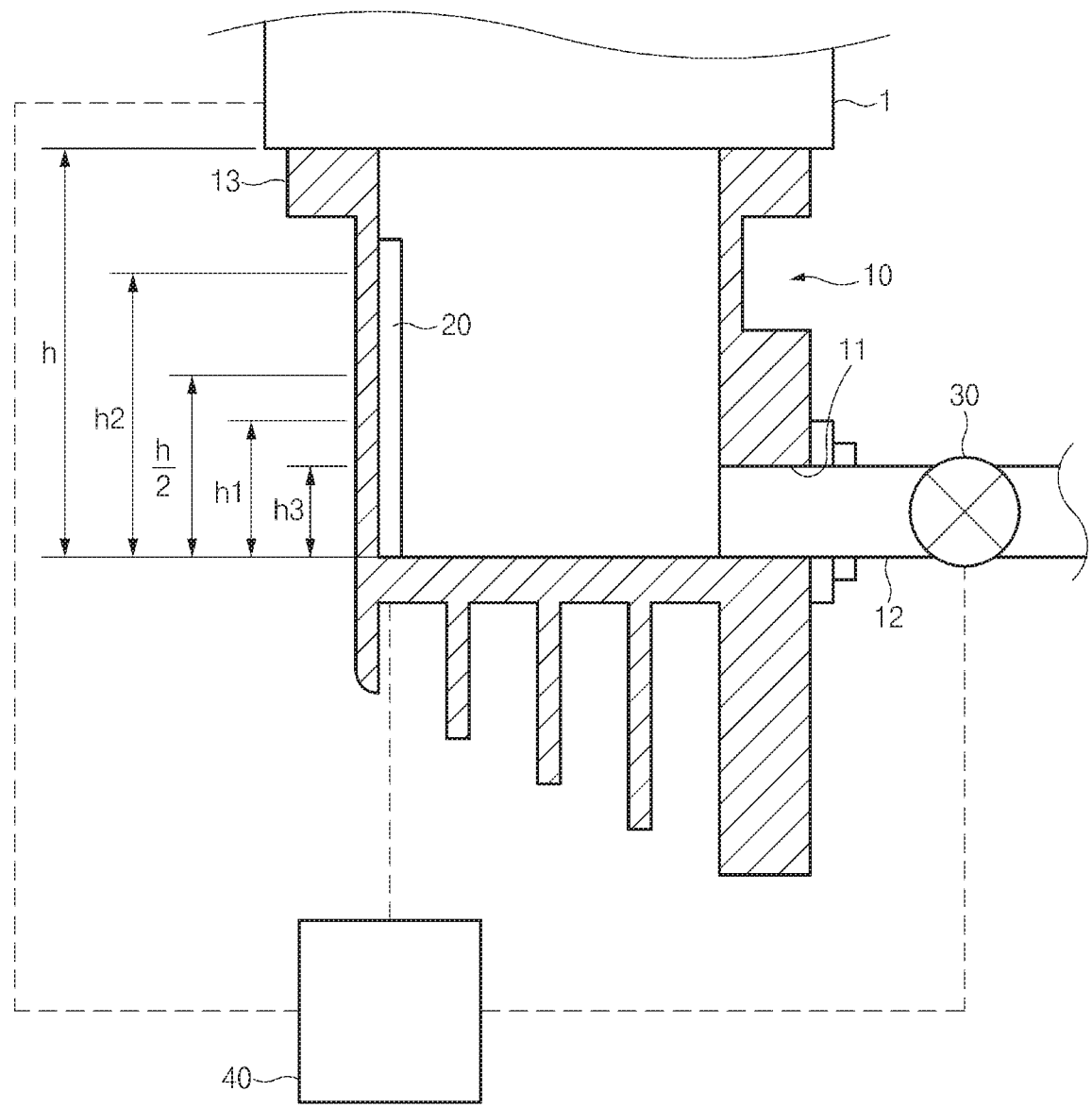
FIG. 1 is a view illustrating an apparatus for discharging a condensate of a fuel cell stack according to an exemplary embodiment of the present disclosure.

Hereinafter, an exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined on the basis of the entire content of this specification.

Referring to FIG. 1, an apparatus for discharging a condensate according to an exemplary embodiment of the present disclosure may include a condensate storage container 10, a condensate level detector 20 detecting a condensate level in the condensate storage container 10, a discharge valve 30 switched to discharge a condensate from the interior of the condensate storage container 10, and a control unit 40 controlling the condensate level detector 20 and the discharge valve 30.

The condensate storage container 10 has a container structure attached to one side of a fuel cell stack 1 and temporarily stores a condensate generated from the fuel cell stack 1.

A coupling flange 13 coupled to the fuel cell stack 1 is positioned in an upper end of the condensate storage container 10, and a discharge hole 11 is provided at one side of the condensate storage container 10. In particular, preferably, the discharge hole 11 is formed below the condensate storage container 10 to allow the condensate to be more smoothly discharged therethrough.

The condensate level detector 20 is installed outside the condensate storage container 10 to precisely detect a condensate level of the condensate stored from the condensate storage container 10.

According to an exemplary embodiment, the condensate level detector 20 may be configured as an analog type condensate level sensor extending in a gravitation direction or may include a plurality of analog unit sensors arranged in the gravitation direction. In this manner, since the condensate level detector 20 is configured as the analog type condensate level sensors arranged in the gravitation direction, condensate discharge levels h1 and h2 for discharging the condensate in the condensate storage container 10 may be variably set, and the variable setting of the condensate discharge levels h1 and h2 may be variously performed through the control unit 40 according to currents of the fuel cell stack 1.

A discharge pipe 12 is hermetically connected to the discharge hole 11 of the condensate storage container 10, and the discharge valve 30 may be installed to be opened and closed in the middle of the discharge pipe 12.

As the discharge valve 30 is opened, the condensate stored in the condensate storage container 10 may be discharged outwardly.

The control unit 40 is connected to the fuel cell stack 1, the condensate level detector 20, and the discharge valve 30. The control unit 40 may set differently the condensate discharge levels h1 and h2 corresponding to points in time at which the discharge valve 30 is to be opened according to currents (high current/low current) of the fuel cell stack 1.

In detail, in a case in which the fuel cell stack 1 has a high current (that is, in a case in which a current from the fuel cell stack 1 is greater than a reference current (a)), the control unit 40 may sense such a current and set a point in time at which the discharge valve 30 for discharging a condensate is to be opened to the first condensate discharge level h1. Thereafter, when the condensate reaches the first condensate discharge level h1 in a state in which the fuel cell stack 1 is in the high current state, the control unit 40 may open the discharge valve 30 to discharge the condensate. Here, the first condensate discharge level h1 is of a height at which introduction of the condensate into the stack 1 is prevented due to a re-circulation gas having fast flow velocity. For example, the first condensate discharge level h1 may be set to be lower than a half (h/2) of the total condensate level h of the condensate storage container 10.

In a case in which the fuel cell stack 1 has a low current (that is, in a case in which the current from the fuel cell stack 1 is lower than the reference current (a)), the control unit 40 may sense such a current and set a point in time at which the discharge valve 30 for discharging the condensate is to be opened to the second condensate discharge level h2. Thereafter, when the condensate reaches the second condensate discharge level h2 in a state in which the fuel cell stack 1 is in the low current state, the control unit 40 may open the discharge valve 30 to discharge the condensate. Here, the second condensate discharge level h2 may be at a position higher than that of the first condensate discharge level h1, and thus, the number of times of opening the discharge valve 30 is relatively reduced compared with the related art, thus lengthening a durability life of the discharge valve 30. For example, the second condensate discharge level h2 may be set to be higher than the half (h/2) of the total condensate level (h) of the condensate storage container 10.

In the above, the exemplary embodiment in which the condensate discharge levels h1 and h2 corresponding to points in time at which the discharge valve 30 is to be opened are varied on the basis of the high current and the low current from the fuel cell stack 1 has been described, but the present disclosure is not limited thereto and a current range of the fuel cell stack 1 may be variously set to vary the condensate discharge levels.

Figure 2:
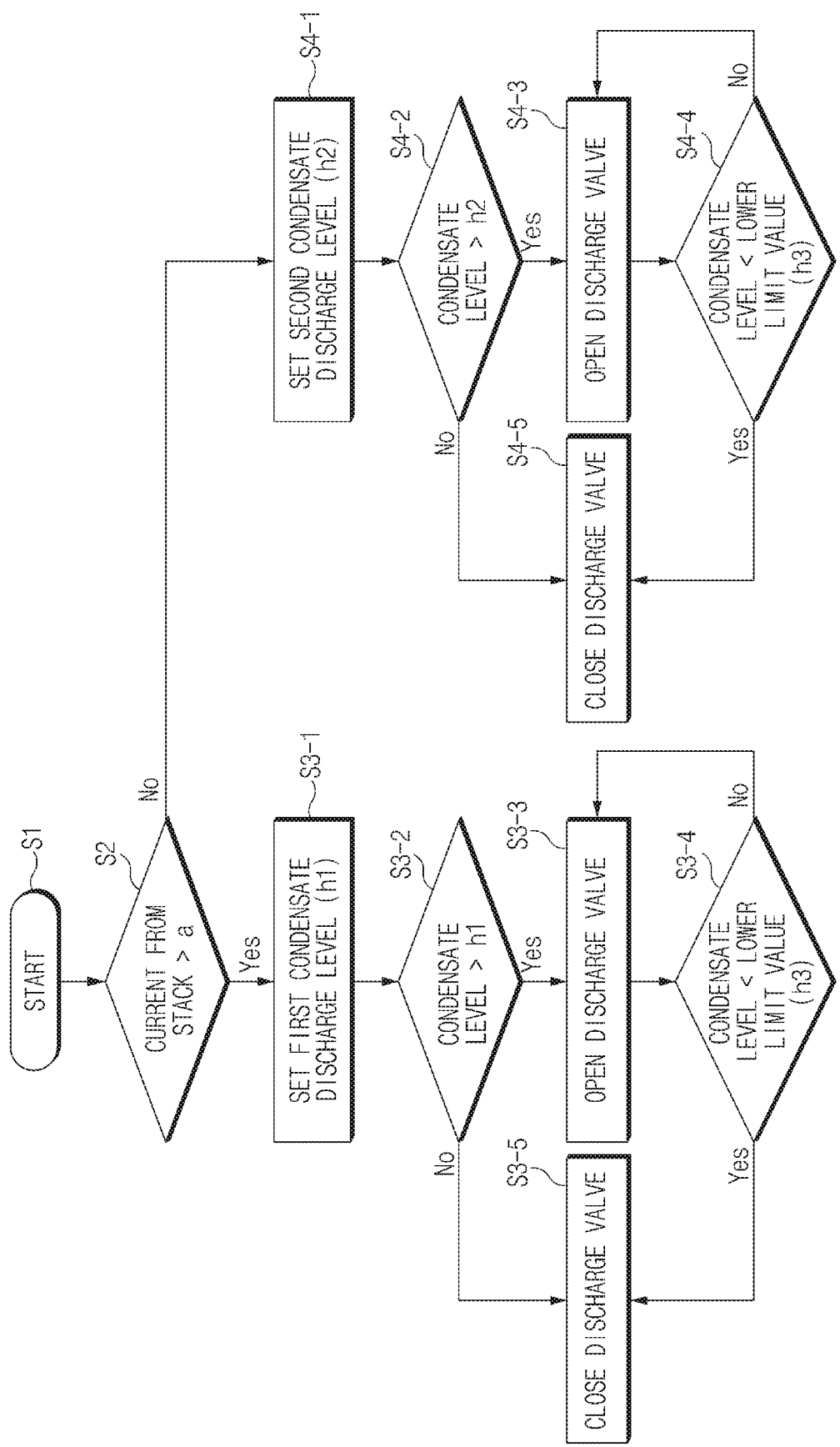
FIG. 2 is a flow chart illustrating a method for discharging a condensate of a fuel cell stack according to an exemplary embodiment of the present disclosure.

FIG. 2 is a flow chart illustrating a method for discharging a condensate of a fuel cell stack according to an exemplary embodiment of the present disclosure.

After the fuel cell stack 1 is started in operation S1, the condensate level detector 20 measures a condensate level in the condensate storage container 10 in real time, and the control unit 40 measures a current from the fuel cell stack 1 and determines whether the current is a high current or a low current in operation S2.

When the current from the fuel cell stack 1 is greater than the reference current (a), the control unit 40 may determine that the fuel cell stack 1 has a high current, and when the current from the fuel cell stack 1 is smaller than the reference current (a), the control unit 40 may determine that the fuel cell stack 1 has a low current.

When the current from the fuel cell stack 1 is greater than the reference current (a) (that is, when the fuel cell stack 1 is in a high current state), the control unit 40 sets the first condensate discharge level h1 corresponding to a point in time at which the discharge value 30 is to be opened on the condensate level detector 20 in operation S3-1.

Thereafter, it is determined whether a condensate level in the condensate storage container 10 is higher than the first condensate discharge level h1 in operation S3-2, and when the condensate level in the condensate storage container 10 is higher than the first condensate discharge level h1, the discharge valve 30 is opened in operation S3-3, and when the condensate level in the condensate storage container 10 is lower than the first condensate discharge level h1, a closed state of the discharge valve 30 is maintained in operation S3-5.

As the condensate in the condensate storage container 10 is discharged due to the opening of the discharge valve 30, it is determined whether a condensate level in the condensate storage container 10 is smaller than a lower limit value h3 in operation S3-4, and when the condensate level in the condensate storage container 10 is smaller than the lower limit value h3, the discharge valve 30 is closed in operation S3-5, and when the condensate level in the condensate storage container 10 is higher than the lower limit value h3, opening of the discharge valve 30 is maintained in operation S3-3. Here, the lower limit value h3 refers to a condensate level corresponding to a diameter of the discharge hole 11 of the condensate storage container 10.

When a current from the fuel cell stack 1 is greater than the reference current (a), the control unit 40 may determine that the fuel cell stack 1 has a high current, and when the current from the fuel cell stack 1 is smaller than the reference current (a), the control unit 40 may determine that the fuel cell stack 1 has a low current.

When the current from the fuel cell stack 1 is smaller than the reference current (a) (that is, when the fuel cell stack 1 is in a low current state), the control unit 40 sets the second condensate discharge level h2 corresponding to a point in time at which the discharge valve 30 is to be opened on the condensate level detector 20 in operation S4-1.

Thereafter, it is determined whether a condensate level in the condensate storage container 10 is higher than the second condensate discharge level h2 in operation S4-2. When the condensate level in the condensate storage container 10 is higher than the second condensate discharge level h2, the discharge valve 30 is opened in operation S4-3, and when the condensate level in the condensate storage container 10 is lower than the second condensate discharge level h2, the discharge valve 30 is maintained in a closed state in operation S4-5.

As the condensate in the condensate storage container 10 is discharged due to the opening of the discharge valve 30, it is determined whether a condensate level in the condensate storage container 10 is smaller than the lower limit value h3 in operation S4-4. When the condensate level in the condensate storage container 10 is smaller than the lower limit value h3, the discharge valve 30 is closed in operation S4-5, and when the condensate level in the condensate storage container 10 is greater than the lower limit value h3, opening of the discharge valve 30 is maintained in operation S4-3. Here, the lower limit value h3 refers to a condensate level corresponding to a diameter of the discharge hole 11 of the condensate storage container 10.

As described above, according to exemplary embodiments of the present disclosure, by varying a discharge level of the condensate according to currents (high current and low current) of a fuel cell, flooding of the fuel cell stack may be effectively prevented and durability of the discharge valve may be enhanced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for discharging a condensate of a fuel cell stack using an apparatus for discharging the condensate of the fuel cell stack having a condensate storage container configured to store the condensate from the fuel cell stack, a condensate level detector for detecting a condensate level in the condensate storage container, and a discharge valve configured to be opened and closed to discharge the condensate from the condensate storage container, the method comprising:
   measuring, by the condensate level detector, a condensate level of the condensate storage container in real time; and
   setting a first condensate discharge level and a second condensate discharge level by comparing a current outputted from the fuel cell stack with a reference current, and opening the discharge valve when a condensate level measured by the condensate level detector reaches the first or second condensate discharge level,
   wherein the first condensate discharge level is set when a current outputted from the fuel cell stack is greater than the reference current, and
   wherein the second condensate discharge level is set when a current outputted from the fuel cell stack is smaller than the reference current.

2. The method according to claim 1, wherein
   when a condensate level in the condensate storage container is higher than the first condensate discharge level, the discharge valve is opened.

3. The method according to claim 2, wherein, after the discharge valve is opened, when a condensate level in the condensate storage container is reduced to be lower than a lower limit value, the discharge valve is closed.

4. The method according to claim 1, wherein
   when a condensate level in the condensate storage container is higher than the second condensate discharge level, the discharge valve is opened.

5. The method according to claim 4, wherein after the discharge valve is opened, when a condensate level in the condensate storage container is reduced to be lower than a lower limit value, the discharge valve is closed.

6. The method according to claim 1, wherein the first condensate discharge level is lower than the second condensate discharge level.

* * * * *